United States Patent [19]

Pittman

[11] Patent Number: 5,411,286
[45] Date of Patent: May 2, 1995

[54] TORSION SPRING AXLE BEAM HAVING EMBOSSED CHANNEL PORTION

[76] Inventor: Jerry W. Pittman, P.O. Box 610149, Dallas, Tex. 75261

[21] Appl. No.: 33,243

[22] Filed: Mar. 16, 1993

Related U.S. Application Data

[62] Division of Ser. No. 790,688, Nov. 8, 1991, Pat. No. 5,215,331.

[51] Int. Cl.$^6$ .............................................. B60G 11/23
[52] U.S. Cl. ..................................... 280/717; 280/723; 301/127
[58] Field of Search ................. 180/905; 280/717, 721, 280/723; 301/124.1, 127, 133

[56] References Cited

U.S. PATENT DOCUMENTS

| | | | |
|---|---|---|---|
| 479,618 | 7/1892 | Bettendorf | 301/124.1 |
| 1,243,401 | 10/1917 | Griswold | 301/127 |
| 1,541,803 | 6/1925 | Evans . | |
| 3,197,228 | 7/1965 | Felburn . | |
| 3,951,225 | 4/1976 | Schwenk | 280/700 |
| 4,386,792 | 6/1983 | Moore et al. | 280/781 |
| 4,637,628 | 1/1987 | Perkins | 280/723 |
| 4,921,231 | 5/1990 | Reynolds . | |

FOREIGN PATENT DOCUMENTS

| | | | |
|---|---|---|---|
| 2740948 | 3/1979 | Germany | 280/723 |
| 1-111512 | 4/1989 | Japan | 280/717 |
| 2061839 | 5/1981 | United Kingdom | 280/717 |

OTHER PUBLICATIONS

Quadraflex brochure; Hayes Axle, Inc.; 1991.
AL-KO Fahrzengteille-Katalog Ausgabe 1983/84; AL-KO Int'l.; Sep. 1983; including without limitation the following pages: Seite 2/1-2/11, 4/1-4/15, and 5/1-5/2.
"Automotive Suspension and Steering", Glenco Publishing Co., Inc., Abbott and Hinerman, 1982.

*Primary Examiner*—Karin L. Tyson
*Attorney, Agent, or Firm*—Crutsinger & Booth

[57] ABSTRACT

In this improved trailer chassis, the accessories which typically added weight without adding to the structural capacity of the trailer have been replaced with accessories which are incorporated into the structural members. The frame of the trailer chassis is comprised of a front and rear beam connecting two longitudinal side beams that incorporate a recess to capture the trailer floor decking. The axle beam mounts between the two side beams to serve as lateral support to the side beams and as a flooring beam and incorporates a open section into its section through which an axle can be mounted. The fenders for the trailer are mounted so that they contribute to the structural integrity of the frame while serving as a side enclosure in addition to a wheel well. The trailer disclosed herein also affords greater flexibility in its design by having optional cross beam members to add lateral support to the side beam members and also serve as supports for the flooring, thereby increasing the overall load capacity of the trailer.

11 Claims, 3 Drawing Sheets

TORSION SPRING AXLE BEAM HAVING EMBOSSED CHANNEL PORTION

This is a division of application Ser. No. 07/790,688, filed Nov. 8, 1991, now U.S. Pat. No. 5,215,331, issued Jun. 1, 1993.

TECHNICAL FIELD

The trailer chassis disclosed herein relates to improvements in the chassis designs for travel trailers, RVs, motor homes, and utility trailers and the assembly thereof.

BACKGROUND OF INVENTION

Trailer chassis heretofore employed for motor homes, recreational vehicles, travel trailers, and utility trailers have been constructed of tubular steel members welded together to form a frame on which angle iron is mounted to support the trailer flooring and to provide a side enclosure.

A trailer chassis is conventionally constructed of sections of 6 by 2 inch or 5 by 2 inch 11 gauge tubing welded together to form a bed which is usually about 194 inches long and approximately 12 inches high. A piece of 3×3¼ inch structural angle iron is generally turned upside down to support lumber planks to form the trailer floor.

An A-frame is usually welded under the chassis to provide a tongue for towing the trailer. The length of the trailer is usually standard lumber length of 16 feet and the bed is made from 2×12 planks. The remaining structure of the trailer is designed around the axle, the under carriage assembly and the flooring. Trailers are usually mounted of leaf spring supported axles.

Trailer chassis developed heretofore have not been constructed to provide much flexibility. The length of the trailer is controlled by the length of standard lumber, sixteen (16) feet. Accessories, such as fenders, added weight to the trailer without adding to the structural capacity of the trailer. The capacity of a conventional trailer chassis is self-limiting because of the inherent weight of the structure.

SUMMARY OF INVENTION

The trailer disclosed herein incorporates structural side members having a cross-section configured to capture the floor decking of the trailer to provide increased structural strength while reducing the overall weight of the trailer and the amount of structural welding.

The structural side members are formed with a groove to receive projections on fender accessories which connect to the structural side members. The fenders incorporate a side enclosure and wheel wells, while providing further reinforcement to the structural side members and thereby increasing the load carrying capacity. The weight of the trailer is about 20% less than the weight of conventional trailers heretofore devised for carrying equivalent loads.

Assembly of the trailer disclosed herein may be performed at satellite locations. Components of the trailer can be prefabricated and shipped to the satellites for easy assembly because only a small amount of welding is necessary.

DESCRIPTION OF THE DRAWINGS

Drawings of a preferred embodiment of the invention are annexed hereto so that the invention may be better and more fully understood, in which.

Numeral references are employed to designate like parts throughout the various figures of the drawing.

DESCRIPTION OF A PREFERRED EMBODIMENT

Figure 1:
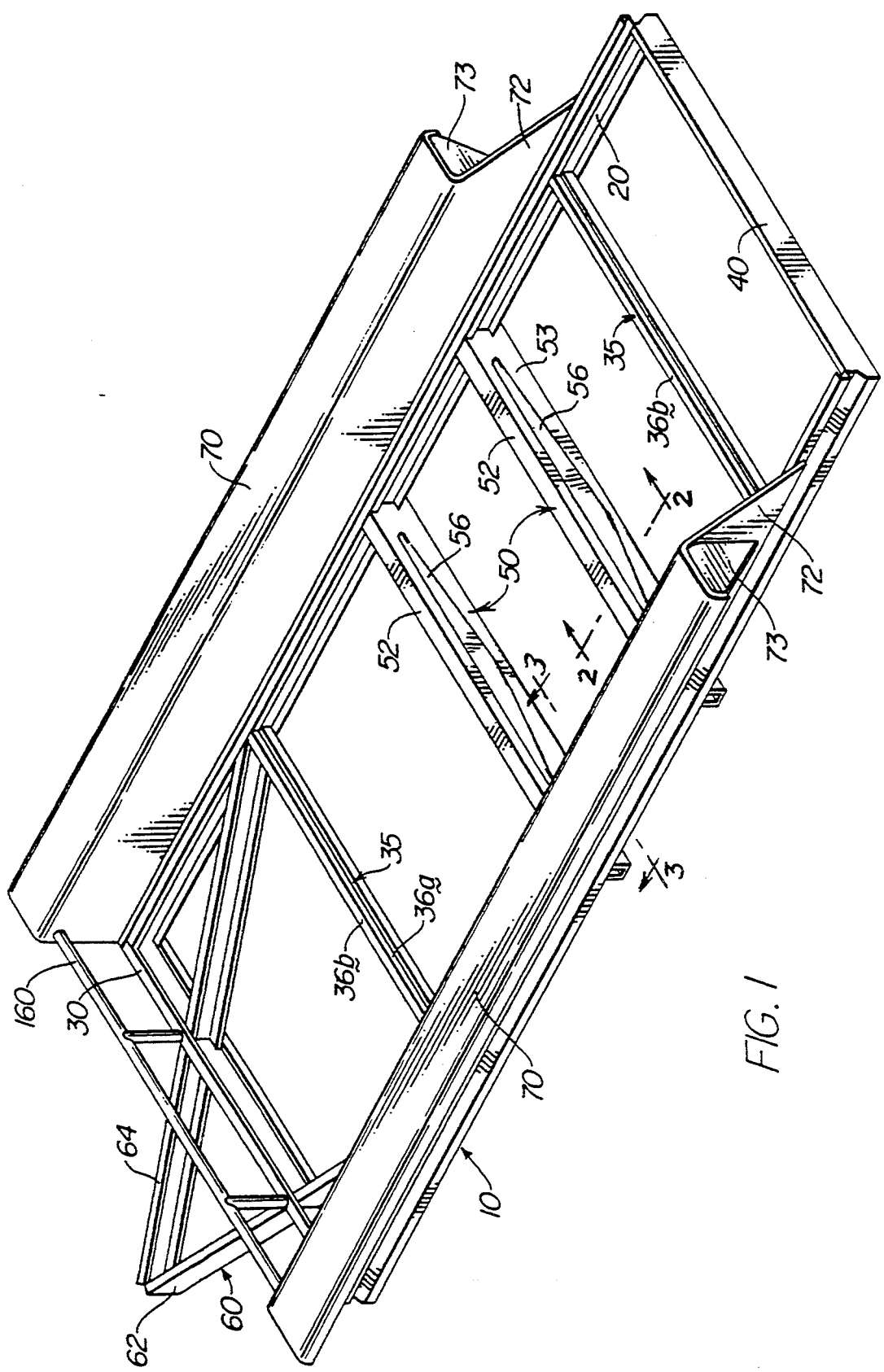
FIG. 1 is a perspective view of a trailer chassis.

Referring to FIG. 1 of the drawing, the numeral 10 generally designates a chassis for a tandem wheeled utility trailer having side beams 20 extending longitudinally along the length of the trailer chassis 10 and connected by a front beam 30 and rear beam 40 having ends welded or otherwise secured to opposite ends of the side beams 20, forming a generally rectangular shaped frame. Cross members 35, extending between the side beams 20, are welded or otherwise secured to the side beams 20 and are located at intermediate positions along the length of the trailer chassis 10 to increase the structural strength and rigidity of the trailer chassis 10.

One or more beam axles 50 are welded or otherwise secured to the side beams 20 at desired locations and fenders 70, mounted on either side of the trailer chassis 10, are secured to the side beams 20 by spot welding at spaced locations along the length of the fender or by Tog-L-Lock fasteners or by other suitable means.

In the embodiment of the trailer chassis 10 illustrated in FIG. 1 of the drawing, a tongue 60 is formed by members 62 and 64 having ends welded or otherwise secured to side beams 20 and being skewed at an angle of, for example, 25° relative to the center line of the trailer chassis 10, to form an A-frame. Forward ends of members 62 and 64 are welded or otherwise secured together and are adapted to receive a trailer hitch coupler (not shown) for attaching to the tongue 60 of the trailer chassis 10 to a trailer hitch on a towing vehicle.

Figure 2:
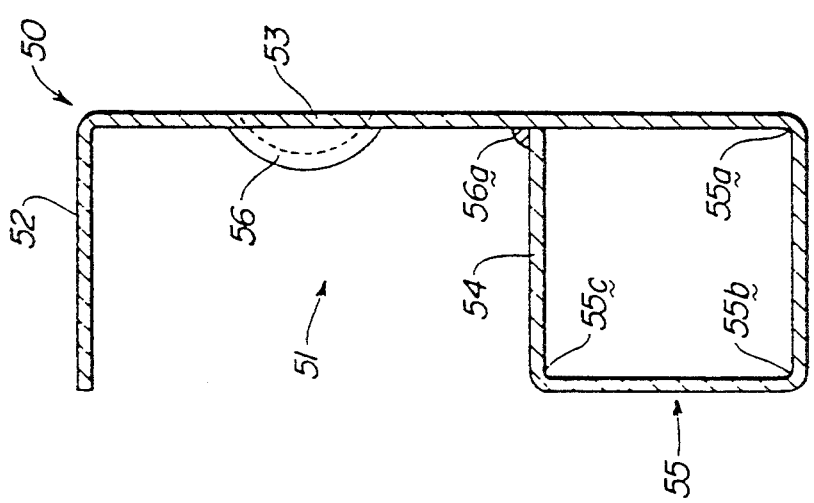
FIG. 2 is a cross-sectional view taken along line 2-2 of FIG. 1.

The axle beam 50 illustrated in FIG. 2, is a composite member formed of a channel section 51 and a non-circular axle tube section 55. The channel section 51 is configured to support and slightly arch the middle of the axle tube section 55 upwardly to impart camber to set the wheels of the trailer closer together at the bottom than at the top. The axle tube 55 is a hollow prismatic tube configured to support a pair of torsion spring bar axles of the type which are commercially available and described in "Quadraflex" Rubber Torsion Axle, Catalog QF-1, 1991 from Hayes Axle, Inc. of Seminole, Okla. the disclosure of which is incorporated herein by reference.

The axle beam 50 is preferably formed from a flat plate of sheet metal having a thickness of, for example, 7 or 8 gauge and is mounted to the lower flange 24 of side beams 20. Opposite ends of the plate are cut to the configuration illustrated in FIG. 3 of the drawing to form a projection 53a which generally conforms to the configuration of side beam 20 to form surfaces on the end of axle beam 50 which are parallel to upper and lower vertical beam elements 22a and 22c and inclined beam element 22b on side beam 20. A slot 53b, which is configured to receive the lower web 24 on side beam 20, is formed adjacent the lower end of projection 53a.

Tooling holes 53c are formed at various locations through the flat plate to facilitate positioning the plate in jigs for cutting, bending, embossing and welding operations.

The flat plate is positioned in a press brake machine and bends 55a, 55b and 55c, best illustrated in FIG. 2 of the drawing, are sequentially made for forming tube member 55, which in the illustrated embodiment is a hollow square tube formed adjacent a rolled edge of the plate.

Figure 4:
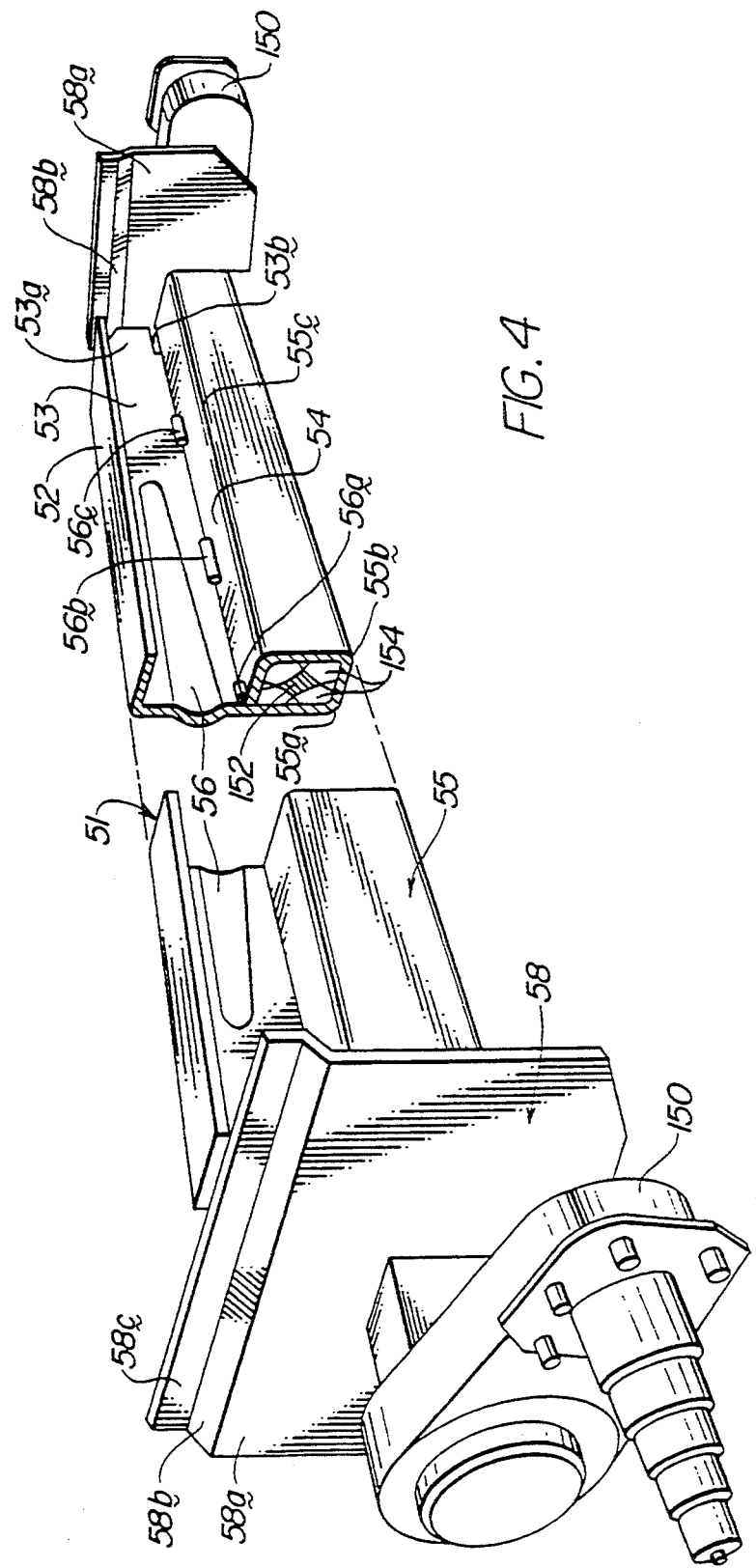
FIG. 4 is a fragmentary perspective view of a beam axle for mounting wheels on a trailer.

The plate is then mounted in an embossing die where embossment 56 is formed in the flange portion 53 of the plate. As best illustrated in FIG. 4 of the drawing, the embossment 56 is tapered from a middle portion of flange 53 and narrows towards ends of flange 53 such that more material is displaced in the embossment adjacent the middle portion of tube member 55. The length and depth of embossment 56 causes tubular member 55 to be bowed, for example, 5/16 inch measured at the center of tube 55 relative to opposite ends of tube 55.

In a preferred embodiment of axle beam 50, tooling holes 53c are formed adjacent the upper flange 52 on 17¾ inch centers spaced along the length of flange 23 for making a tube 55 which is 77½ inches long. Tooling pins in the embossing die extend through the tooling holes for stabilizing the edge of flange 53 which extends longitudinally of upper web 52. When the embossing die is urged into engagement with flange 53, metal is drawn moving the middle portion of tube 55 toward web 52. While the embossing die is in the closed position, a tack weld 56a which is about 2 inches long, is made at the middle of tube 55. Tack welds 56c are made at locations spaced apart about 8 inches along the remainder of the length of tube 55. One or more welds 56b may be used in lieu of welds 55c in a middle portion of tube 55 for increasing the camber in tube 55.

After the spaced tack welds 56a, 56b and 56c have been made securing the top side 54 of tube 55 to flange portion 53 of beam 50, the beam is removed from the embossing die.

The axle beam 50, formed from a plate of heavy gauge metal, is bent near the top edge of the plate to form an upper flange 52. Other bends are made in the lower portion of the plate to form a non-circular tubular section 55.

A web 53 of the section is formed between the two bends in the plate. The top side 54 of the tube section 55 is welded to the web 53 of the section thereby forming the lower flange of the channel-shaped section. The axle beam 50 can be alternatively described as a channel-shaped section 51 formed by an upper flange 52, a web 53, and a lower flange 54. A web 53 extends between the two flanges 52 and 54. The lower flange 54 also forms the top side of a tube section 55. The tube section 55 is a non-circular closed section which is welded at the juncture of the top side 54 of the tube and the bottom of channel web 53. The tapered embossment 56 is centrally located in the web 53 of the channel section 51.

The axle beam 50 serves two purposes; first, the axle beam 50 is a structural beam which increases the overall capacity of the trailer chassis 10 by providing lateral support to the side beams 20 and providing support for the flooring; secondly, the tube section 55 of the axle beam 50 provides a means for mounting a rubber axle to the trailer. The tube section 55 is an open section receiving an axle through one end of the beam to pass through and connect to a wheel on the other side of the axle beam 50.

The camber of the axle beam member 50 is controlled by the size and length of the embossment 56 in the web 53 and by the amount of weld deposited at the juncture of the top side 54 of the tube section 55 and the web 53 of the channel member 51. The embossment 56 also increases the section modulus of the beam section 50, thereby increasing its resistance to bending moments. The sides of the channel section 51 are coped to fit the profile of the side beams 20 with the tube section 55 positioned below the bottom flange of the side beam 20.

In an illustrated embodiment, the trailer chassis 10 is constructed with two axle beam members 50. The axle beams are located adjacent to each other, separated by the distance necessary for the wheels to have a clear distance between them.

The torsion spring bar axle for vehicle trailer wheels, illustrated in FIG. 10, includes a swing lever 150 mounted on a torsion bar 152 supported in said hollow axle tube 55. Resilient rubber cords 154 secure said torsion bar 152 to said axle tube 55 to permit limited pivotal movement of said wheel swing lever 150. As described hereinbefore, composite axle beam member 55 has a rolled edge portion forming said hollow axle tube 55 and a folded edge portion forming a channel member 51 having an embossment 56 formed thereon to arch said hollow axle tube 55. Since the embossment 56 is wider in the middle of the channel member 51 than the width of the embossment adjacent ends of the channel member 51, a concave arch is formed in the middle of the hollow tube 55.

Spaced welds 56a, 56b and 56c between said folded edge portion 55 and said channel member 51 provide camber. Weld 56a adjacent the middle of the tube 55 is longer than welds 56b and 56c spaced from the middle of the tube 55 toward ends of the tube.

Figure 3:
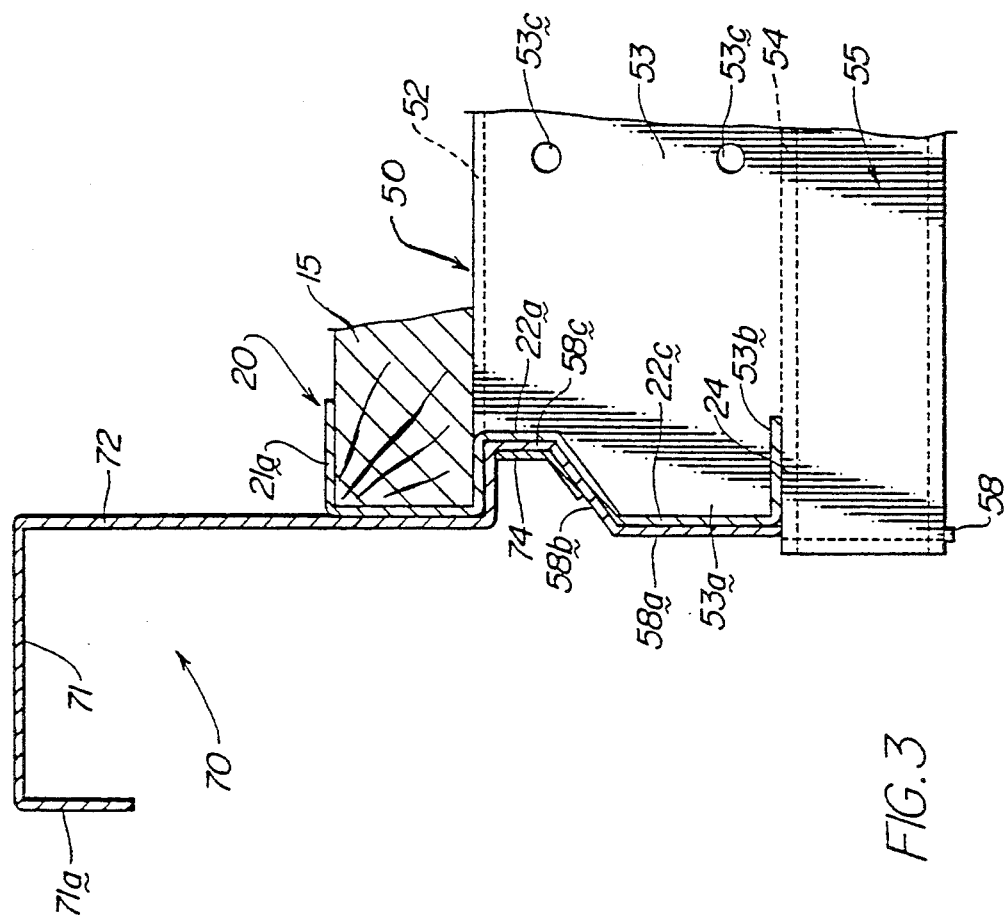
FIG. 3 is a cross-sectional view taken along line 3-3 of FIG. 1.

Channel member 51 has coped ends shaped to fit in the seat bounded by flanges 22a, 22b and 22c on side beams 20 of the trailer chassis 10. As illustrated in FIG. 3, the tube 55 is longer than said channel member 51 and a mounting bracket, bent to form sections 58a, 58b and 58c, has a notch 58d which straddles the end of tube 55. The coped end on said channel member 55 is configured to be welded or otherwise attached to one side of side beam 20 when projection 23a is adjacent web 23c on side beam 20. The mounting bracket 58 is welded onto the end of tube 55 and bolted or welded to side beam 20.

As best illustrated in FIG. 9, the vertical leg 72 of the fender 70 is longer than the horizontal leg 71, with the lower portion 74 of the vertical leg 72 extending down below the reinforcing plate 73 and configured to match the profile of the side beam 20 web seat 23, thereby allowing the fender 70 to be connected to the web 22 of the side beam 20. The upper portion of the vertical leg 72 of the fender 70 provides a side enclosure and may extend over the entire length of the trailer chassis 10 or may be tapered so that the upper portion of the vertical side 72 only extends along a segment of the length of the trailer chassis 10. With the fender 70 incorporated into the side beam members 20, the side beam 20 section properties are significantly increased thereby increasing the load carrying capacity of the trailer chassis 10. The maximum capacity of the trailer chassis 10, therefore, is achieved where the fender 70 has a vertical side 72 extending over the entire length of the trailer chassis 10.

Prepainted fenders can be attached to side beams 20 with "Tog-A-Lock" fasteners, bolts and the like without damaging the painted surfaces.

A tube 160 has opposite ends welded or otherwise secured adjacent the front end of each fender 70 to form a rail across the front end of the trailer.

Having described the invention, it is claimed:

1. A torsion spring bar axle for vehicle trailer wheels including a swing lever mounted on a torsion bar; a hollow axle tube, said torsion bar being supported in said hollow axle tube; resilient means securing said torsion bar to said axle tube to permit limited pivotal movement of said swing lever, said axle tube comprising: a composite member having a rolled edge portion forming said hollow axle tube and a folded edge portion forming a channel member, said channel member having an embossment formed thereon to arch said hollow axle tube; and spaced welds between said folded edge portion and said channel member.

2. A torsion spring bar axle for vehicle trailer wheels according to claim 1, said embossment being wider in the middle of the channel member than the width of the embossment adjacent ends of the channel member to form a concave arch in the middle of the hollow tube.

3. A torsion spring bar axle for vehicle trailer wheels according to claim 2, said welds comprising: a weld adjacent the middle of the tube which is longer than welds spaced from the middle of the tube toward ends of the tube.

4. A torsion spring bar axle for vehicle trailer wheels according to claim 3, said channel member having coped ends shaped to fit in a seat formed in a trailer chassis.

5. A torsion spring bar axle for vehicle trailer wheels according to claim 4, wherein said tube is longer than said channel member, and with the addition of: mounting means on said tube, said coped end on said channel member being configured for attachment to one side of a member forming the trailer chassis and said mounting means on said tube being configured for attachment to another side of said member.

6. An axle beam for an axle comprising: a composite tubular member having non-circular end portions configured to support an axle, said composite tubular member having at least one vertical surface, said vertical surface having an embossment tapering from a middle portion and narrowing toward ends of said vertical surface for forming an arch in said composite tubular member between said end portions.

7. An axle beam according to claim 6, said non-circular end portions being configured to support torsion spring bar axles.

8. An axle beam according to claim 7, said composite tubular member comprising: a channel section and a non-circular axle tube section, said embossment being formed on said channel section to slightly arch said tube section.

9. An axle beam according to claim 8, with the addition of: a torsion bar; a swing lever mounted on said torsion bar, said torsion bar being movably secured to said axle tube section.

10. An axle beam for supporting a wheel on a swing lever comprising: a composite member having non-circular end portions; resilient cords secured to said non-circular end portions, said resilient cords being configured to movably support said swing lever, said composite member having an embossment having a predetermined width less than the width of the composite member and a depth for providing an arch in said composite member for establishing camber of the wheels.

11. An axle beam for supporting wheels mounted on swing levers comprising: a composite member formed by a channel section having a vertical surface and a non-circular axle tube section, said vertical surface on said channel section having an embossment tapering from a middle portion and narrowing toward ends of said vertical surface, said embossment having a length and depth formed to slightly arch said non-circular axle tube section; and resilient cords in said axle tube section for mounting a swing lever for limited pivotal movement relative to said axle tube, said arch in said axle tube setting camber.

* * * * *